United States Patent
Brooks et al.

(10) Patent No.: US 6,810,318 B2
(45) Date of Patent: Oct. 26, 2004

(54) DRIVE TORQUE TRANSFER SCHEME

(75) Inventors: Cary Walter Brooks, Shelby Township, MI (US); Anthony Luke Simon, W. Bloomfield, MI (US); Allen John Walenty, Macomb, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/243,132

(22) Filed: Sep. 13, 2002

(65) Prior Publication Data

US 2004/0054459 A1 Mar. 18, 2004

(51) Int. Cl.[7] .............................................. G06F 17/00
(52) U.S. Cl. ...................................... 701/82; 180/197
(58) Field of Search ............................. 701/82, 89, 69; 180/197, 248

(56) References Cited

U.S. PATENT DOCUMENTS

| | | |
|---|---|---|
| 3,400,610 A | 9/1968 | Taylor et al. |
| 3,476,200 A | 11/1969 | Schoepe et al. |
| 4,263,824 A | 4/1981 | Mueller |
| 4,304,317 A | 12/1981 | Vanzant et al. |
| 4,305,490 A | 12/1981 | Hendrickson |
| 4,335,430 A | 6/1982 | Ohmori et al. |
| 4,417,641 A | 11/1983 | Kageyama |
| 4,440,042 A | 4/1984 | Holdeman |
| 4,441,575 A | 4/1984 | Suzuki |
| 4,484,653 A | 11/1984 | Horikoshi et al. |
| 4,511,014 A | 4/1985 | Makita |
| 4,529,072 A | 7/1985 | Oguma et al. |
| 4,556,134 A | 12/1985 | Takano |
| 4,566,554 A | 1/1986 | Suzuki |
| 4,576,061 A | 3/1986 | Yamakawa et al. |
| 4,582,159 A | 4/1986 | Suzuki |
| 4,609,064 A | 9/1986 | Suzuki et al. |
| 4,613,008 A | 9/1986 | Hiraiwa et al. |
| 4,628,056 A | 12/1986 | Levitt et al. |
| 4,628,770 A | 12/1986 | Kodama et al. |
| 4,630,704 A | 12/1986 | Yamakawa et al. |
| 4,644,823 A | 2/1987 | Mueller |
| 4,664,216 A | 5/1987 | Kodama et al. |
| 4,669,569 A | 6/1987 | Suzuki et al. |

(List continued on next page.)

OTHER PUBLICATIONS

Atkinson, "The Torque–on–Demand Electromagnetic Clutch," Automotive Technology International 1989, pp. 263–266.

Moroto et al, "A Computer Controlled Transfer for Four–Wheel Drive Vehicles," SAE Technical Paper No. 850354, 1985, pp. 9–23.

"Nissan Electronic Torque Split 4WD System," Nissan Motor Co., Ltd., pp. 1–20, undated.

*Primary Examiner*—Michael J. Zanelli
(74) *Attorney, Agent, or Firm*—Cary W. Brooks

(57) ABSTRACT

The present invention relates to methods of torque transfer, torque transfer units, and vehicles incorporating the same. According to the method, a delta signal indicative of a rotational condition of the first driveline is generated and a torque transfer unit is controlled as a function of a torque transfer control algorithm. The control algorithm commands a transfer torque representing an amount of torque to transfer from the source of power to one of the first and second drivelines. The torque transfer control algorithm is a function of the delta signal and is substantially independent of any rotational condition of the second driveline over a primary operational range of the algorithm. Reference values may comprise a desired vehicle acceleration value, an actual vehicle acceleration value, a vehicle ground speed value, temporally displaced first driveline acceleration values, temporally displaced first driveline speed values, and combinations thereof.

78 Claims, 6 Drawing Sheets

U.S. PATENT DOCUMENTS

| | | |
|---|---|---|
| 4,681,185 A | 7/1987 | Hoernig et al. |
| 4,700,797 A * | 10/1987 | Leiber ..................... 180/197 |
| 4,705,134 A | 11/1987 | Kitade |
| 4,714,127 A | 12/1987 | Fanti et al. |
| 4,715,466 A | 12/1987 | Ishii et al. |
| 4,718,303 A | 1/1988 | Fogelberg |
| 4,751,857 A | 6/1988 | Sakai |
| 4,770,266 A | 9/1988 | Yamaguchi et al. |
| 4,781,265 A * | 11/1988 | Weiler et al. ............ 180/233 |
| 4,782,930 A | 11/1988 | Kuroiwa et al. |
| 4,804,059 A | 2/1989 | Sakakiyama |
| 4,805,469 A | 2/1989 | Commarmot |
| 4,821,606 A | 4/1989 | Leiber |
| 4,830,136 A | 5/1989 | Sommer |
| 4,836,322 A | 6/1989 | Sakakiyama |
| 4,840,246 A | 6/1989 | Yamakawa et al. |
| 4,840,247 A | 6/1989 | Kashihara et al. |
| 4,860,208 A | 8/1989 | Bantle |
| 4,874,056 A | 10/1989 | Naito |
| 4,890,685 A | 1/1990 | Naito |
| 4,895,236 A | 1/1990 | Sakakibara et al. |
| 4,896,738 A | 1/1990 | Kodama |
| 4,921,065 A | 5/1990 | Hamada et al. |
| 4,941,541 A | 7/1990 | Ito et al. |
| 4,950,214 A | 8/1990 | Botterill |
| 4,966,250 A | 10/1990 | Imaseki |
| 4,987,967 A | 1/1991 | Kouno |
| 5,010,974 A | 4/1991 | Matsuda |
| 5,065,836 A | 11/1991 | Hamada et al. |
| 5,075,854 A | 12/1991 | Imaseki et al. |
| 5,078,249 A | 1/1992 | Botterill |
| 5,083,986 A | 1/1992 | Teraoka et al. |
| 5,106,349 A | 4/1992 | Botterill et al. |
| 5,107,972 A | 4/1992 | Sundquist |
| 5,119,298 A | 6/1992 | Naito |
| 5,132,908 A | 7/1992 | Eto et al. |
| 5,183,131 A | 2/1993 | Naito |
| 5,199,325 A | 4/1993 | Reuter et al. |
| 5,251,132 A | 10/1993 | Bulgrien |
| 5,251,719 A | 10/1993 | Eto et al. |
| 5,275,252 A | 1/1994 | Sperduti et al. |
| 5,275,253 A | 1/1994 | Sperduti et al. |
| 5,323,871 A * | 6/1994 | Wilson et al. ............ 180/197 |
| 5,330,030 A | 7/1994 | Eastman et al. |
| 5,352,164 A | 10/1994 | Bensinger et al. |
| 5,363,938 A | 11/1994 | Wilson et al. |
| 5,400,866 A | 3/1995 | Wilson et al. |
| 5,407,024 A * | 4/1995 | Watson et al. ............ 180/248 |
| 5,410,110 A | 4/1995 | Burmeister et al. |
| 5,492,194 A | 2/1996 | McGinn et al. |
| 5,497,333 A | 3/1996 | Sasaki |
| 5,582,263 A | 12/1996 | Varma et al. |
| 5,599,249 A | 2/1997 | Zalewski et al. |
| 5,605,201 A | 2/1997 | McGinn et al. |
| 5,655,618 A | 8/1997 | Wilson et al. |
| 5,688,202 A * | 11/1997 | Bowen ..................... 475/199 |
| 5,704,444 A | 1/1998 | Showalter |
| 5,950,750 A | 9/1999 | Dong et al. |
| 5,954,150 A | 9/1999 | Miller et al. |
| 5,980,415 A * | 11/1999 | Showalter ................. 475/213 |
| 6,071,207 A | 6/2000 | Stephens et al. |
| 6,105,702 A | 8/2000 | Showalter |
| 6,263,995 B1 | 7/2001 | Watson et al. |
| 6,315,097 B1 | 11/2001 | Burns |
| 6,615,126 B1 * | 9/2003 | Potter et al. ............... 701/84 |
| 6,631,779 B2 | 10/2003 | Watson et al. |
| 2001/0025219 A1 * | 9/2001 | Ohba et al. ................ 701/89 |

* cited by examiner

DRIVE TORQUE TRANSFER SCHEME

TECHNICAL FIELD

The present invention relates to a power transfer scheme for controlling the distribution of drive torque between first and second or front and rear drivelines of a vehicle.

BACKGROUND OF THE INVENTION

A number of different power transfer systems are currently utilized for directing power, i.e., drive torque, to the front and rear drivelines of a vehicle. "On-demand" power transfer systems automatically direct power to the non-driven wheels of a vehicle when traction is lost at the driven wheels. The "on-demand" feature is incorporated into the transfer case by providing a clutch assembly that is interactively associated with an electronic control system and a sensor arrangement arranged to detect the wheel speed difference between the driven and non-driven wheels. During normal road conditions, the clutch assembly is maintained in a non-actuated condition such that drive torque is only delivered to the driven wheels. Sensors are provided to monitor the speeds of the driven and non-driven wheels. The driven and non-driven wheel speeds are utilized to generate a wheel slip or low traction condition. The clutch assembly is actuated based upon the directly measured relative speeds of the driven and non-driven wheels to deliver drive torque "on-demand" to the non-driven wheels.

One example of such an "on-demand" power transfer system is disclosed in U.S. Pat. No. 5,323,871 to Wilson et al. wherein the electronically-controlled clutch assembly is operable for automatically controlling the amount of drive torque transferred to the non-driven wheels as a function of the wheel speed difference between the driven and non-driven wheels. Similarly, U.S. Pat. Nos. 5,407,024, 5,485,894 and 6,062,330 to Watson et al., and 5,980,415 to Showalter each teach systems where power transfer is controlled by monitoring the respective speeds of the both the driven and non-driven wheels. Specifically, in U.S. Pat. Nos. 5,407,024, 5,485,894 and 6,062,330, a pair of primary and secondary drive shaft speed sensors are provided for measuring the respective speeds of the driven and non-driven wheels. Torque transfer is affected when the speed of one drive shaft exceeds the speed of the other drive shaft by a predetermined value. In U.S. Pat. No. 5,980,415, the speed sensors used to control torque transfer include rear driveline speed sensors and front driveline speed sensors. Clutch engagement is increased until the speed difference between the front and rear drivelines is reduced below a predetermined value. The clutch current is reduced when the speed difference between the front and rear drive shafts is reduced below the predetermined value.

For the reasons discussed in detail below in the Summary of the Invention, there is a need for a torque transfer control scheme that represents an improvement over the prior art "on demand" transfer schemes that rely upon the sensed speed of both the front and rear drivelines.

SUMMARY OF THE INVENTION

This need is met by the present invention wherein the present inventors have recognized that the aforementioned "on demand" systems all rely upon the sensed speed of both the front and rear drivelines and, as such, present operational and design challenges that need to be addressed by an approved torque transfer scheme. From a design standpoint, it is difficult to minimize system cost if hardware and software must be provided for sensing the speed, and the differences in speeds, of both the driven and non-driven wheels.

Torque transfer schemes that are dependent upon the sensed speed of both the front and rear drivelines are typically deficient from an operational standpoint in that they are subject to the introduction of error through routine vehicle acceleration. More specifically, regarding the introduction of error through routine vehicle acceleration, routine acceleration causes a loss of traction in the driven wheels of the vehicle. This loss of traction generates higher wheel speed data and a corresponding distortion in the data representing the difference in speeds of the driven and non-driven wheels. This distortion, which varies depending upon the coefficient of friction of the road surface, must then be accounted for in the software or hardware of the torque transfer system.

Use of a signal indicative of the difference between the front and rear wheel speeds is also subject to the introduction of error under tight turning conditions because the front and rear wheels turn in separate turning circles. More specifically, the speed error increases with vehicle speed and steering angle so that when the front wheels reach a certain speed (e.g., 5 mph) during the tightest turn (e.g., at full steering wheel lock), the difference in speed between the front and rear wheels (e.g., 2 mph) is often sufficient to engage torque transfer. This type of false engagement is likely to occur every time a vehicle turns regardless of the coefficient of friction—even if there is no loss of traction.

From an additional operational standpoint, it is difficult to address "plowing" conditions in torque transfer schemes that are dependent upon the sensed speed of both the front and rear drivelines. Specifically, plowing is a condition that occurs when the front, or non-driven, wheels of a vehicle enter deformable surfaces, such as standing water, mud, dirt, sand, snow or gravel. The weight of the vehicle causes the non-driven wheels to sink into the deformable surface and the material of the deformable surface (e.g., water, mud, dirt, sand, snow, or gravel) plows up against the front of the non-driven wheels, slowing them down. In effect, the non-driven wheels travel uphill, smoothing the surface for the rear, driven wheels. In most cases, the driven wheels are unaffected by this plowing condition because they will maintain the commanded speed. The present invention is based upon the recognition that the prior art scheme, where control of torque transfer is based upon the speed of the driven and non-driven wheels, will cause false engagement of the transfer case because the sensed speed of the non-driven front wheels is not accurate under plowing conditions. Specifically, in the prior art system, the difference between the front and rear wheel speeds could be skewed enough by the plowing to cause activation of the transfer case and transfer of torque to the non-driven wheels.

For example, if a truck maintains a true vehicle speed of 25 mph and crosses an unplowed intersection of six inches of snow, the non-driven front wheels may abruptly drop in speed down to 21 mph or less while the driven rear wheels maintain a speed of 25 mph. If the threshold for activating torque transfer is about 3 mph, the 4 mph difference between the front and rear wheels in this case will cause torque transfer to be affected even though there is actually zero wheel slippage.

In accordance with one embodiment of the present invention, a method of controlling torque transfer is provided. According to the method, a delta signal indicative of a rotational condition of the first driveline is generated and a torque transfer unit is controlled as a function of a torque transfer control algorithm. The control algorithm commands a transfer torque representing an amount of torque to transfer from the source of power to one of the first and second drivelines. The torque transfer control algorithm is a function of the delta signal and is substantially independent of any rotational condition of the second driveline over a primary operational range of the algorithm.

In accordance with another embodiment of the present invention, a method of controlling torque transfer is provided where a delta signal indicative of a difference between a reference value and a rotational condition of the first driveline is generated. The reference value comprises a desired vehicle acceleration value determined as a function of maximum output torque, a desired torque command signal generated by a throttle position sensor, vehicle weight, and grade. The rotational condition of the first driveline is indicative of a temporal change in one of rotational speed or rotational acceleration of the first driveline. The torque transfer unit is controlled as a function of a torque transfer control algorithm. The torque transfer control algorithm is a function of the delta signal and commands a transfer torque representing an amount of torque to transfer from said source of power to one of said first and second drivelines.

In accordance with yet another embodiment of the present invention, a method of controlling torque transfer is provided where a delta signal indicative of a rotational condition of the first driveline is generated. The delta signal comprises a signal indicative of a difference between a reference value and a selected one of a plurality of different rotational conditions of the first driveline, including a primary rotational condition and at least one alternative rotational condition. The reference value comprises one of a desired vehicle acceleration value, an actual vehicle acceleration value, a vehicle ground speed value, temporally displaced first driveline acceleration values, temporally displaced first driveline speed values, and combinations thereof. The torque transfer control algorithm determines the selected rotational condition. The algorithm exhibits a preference for the alternative rotational condition over the primary rotational condition when a difference between the reference value and the rotational condition does not exceed a torque transfer threshold and when a difference between the reference value and the alternative rotational condition exceeds the torque transfer threshold.

Additional embodiments, including additional methods of torque transfer, torque transfer units, and vehicles incorporating the same, are also contemplated by the present invention. Accordingly, it is an object of the present invention to provide improved methods and apparatus for torque transfer. Other objects of the present invention will be apparent in light of the description of the invention embodied herein.

BRIEF DESCRIPTION OF THE DRAWINGS

The following detailed description of specific embodiments of the present invention can be best understood when read in conjunction with the following drawings, where like structure is indicated with like reference numerals and in which.

DESCRIPTION OF THE PREFERRED EMBODIMENT

Figure 4:
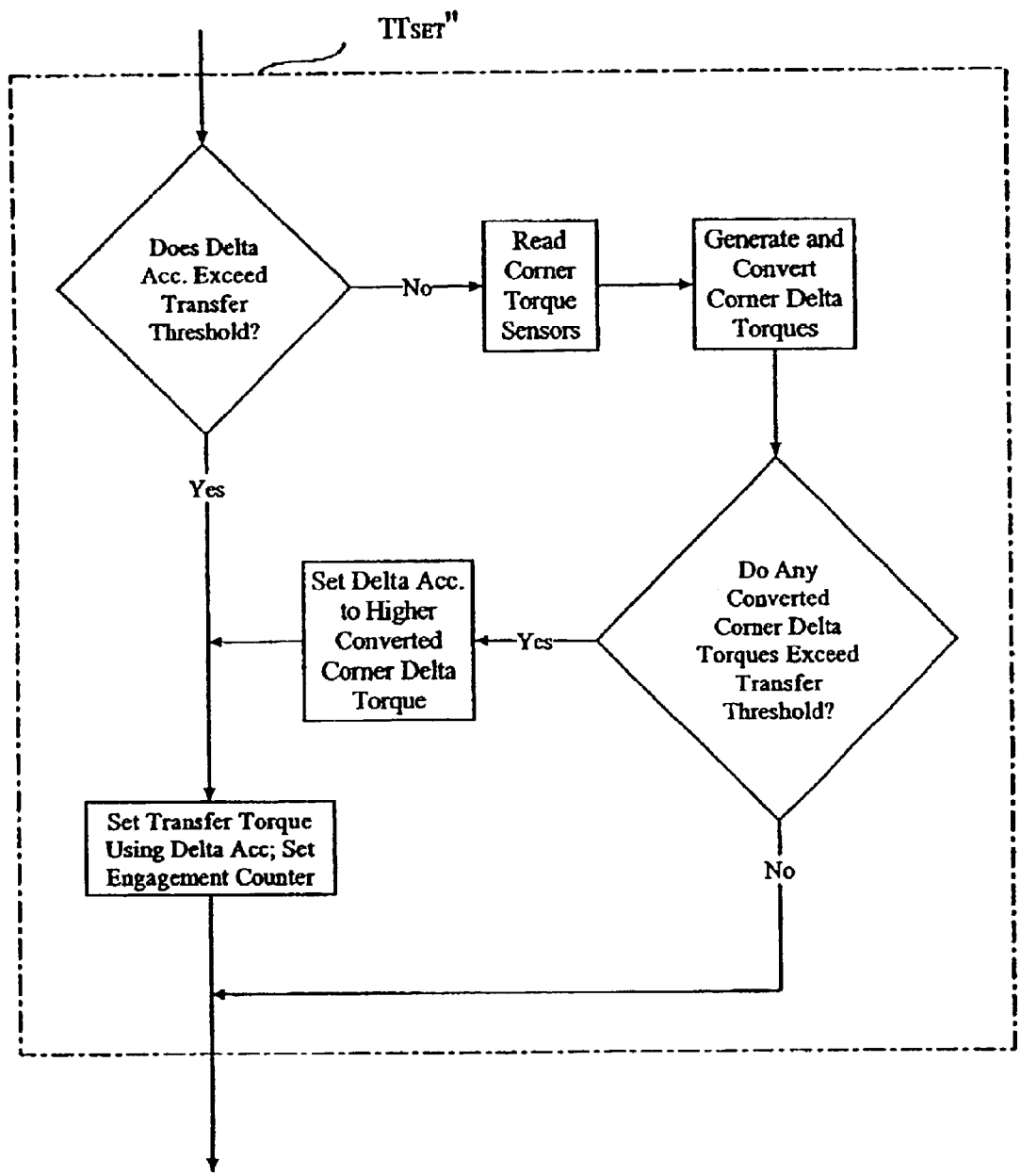
Figure 5:
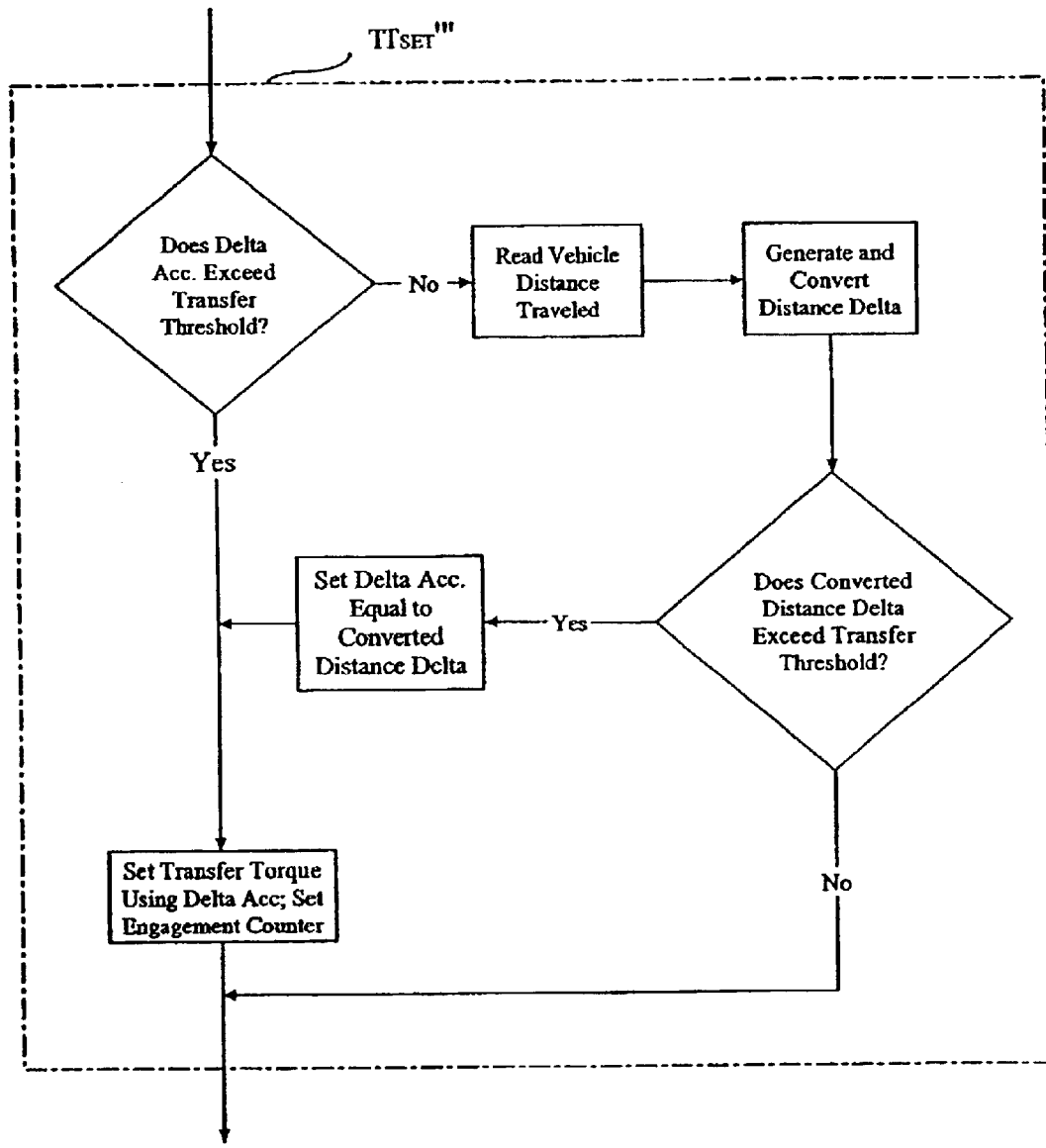
Figure 6:
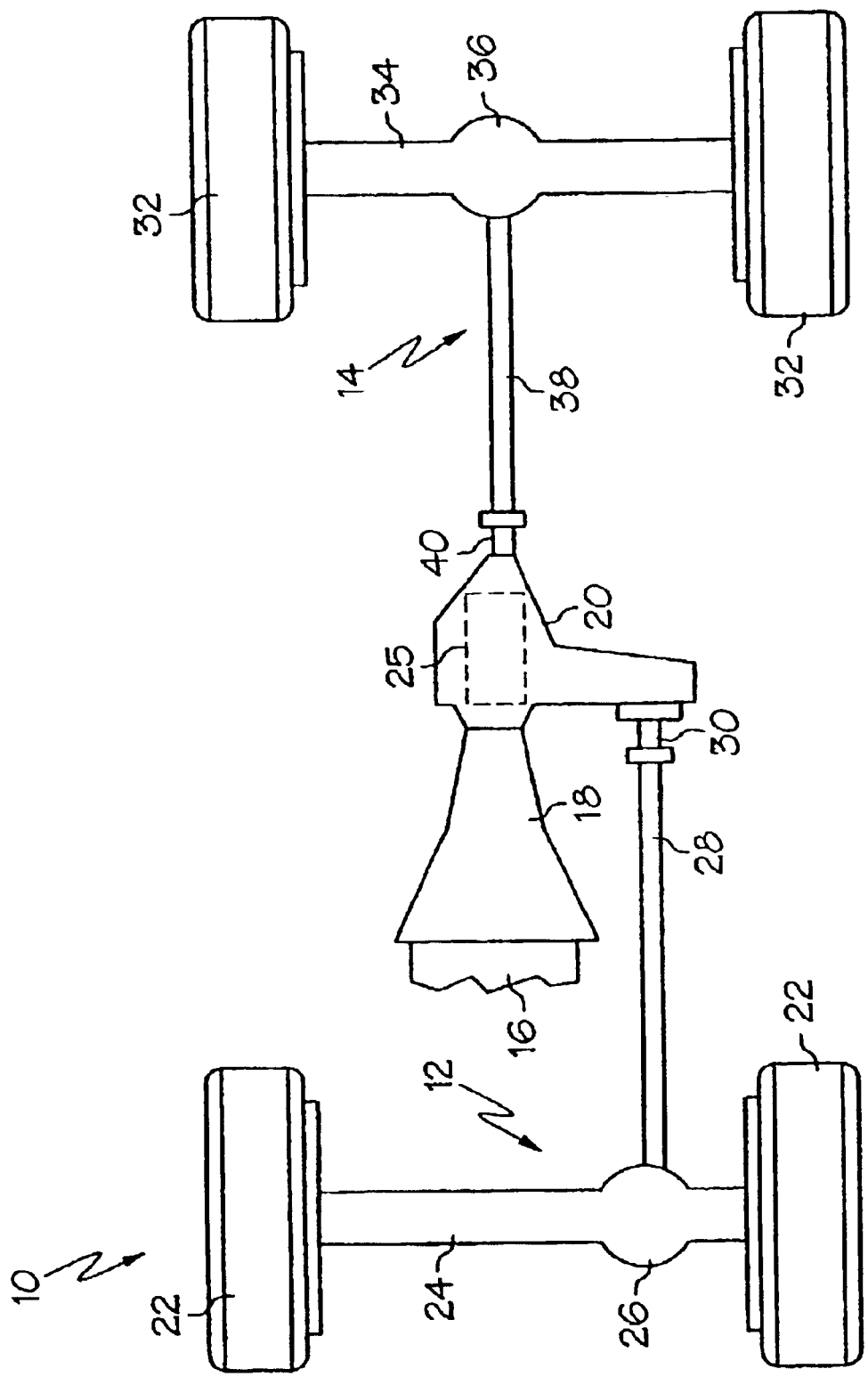
FIG. 6 is a schematic illustration of a vehicle embodying a drive torque transfer scheme according to the present invention.

FIGS. 1–5 are flowcharts illustrating some of the various drive torque transfer schemes contemplated by the present invention. Referring to FIG. 6, a vehicle 10 embodying the drive torque transfer scheme according to the present invention is illustrated schematically. The drive train of the vehicle 10 includes a front driveline 12 and a rear driveline 14 both drivable from an engine or other source of power 16 through a transmission 18 or another power coupling. The drive train also includes a torque transfer unit 20 including a controller 25. The torque transfer unit 20 is configured to couple the source of power 16 to the front and rear drivelines 12, 14. Although the controller 25 is illustrated as a schematic block within the transfer unit 20, it is contemplated that its actual position relative to the transfer unit 20 is not the subject of the present invention. Rather, all that is required of the controller 25 is that it be in signal communication with at least one component of the transfer unit 20.

The front driveline 12 and rear driveline 14 are also referred to herein as first and second drivelines. Although designation of either driveline as the first or second driveline is not central to the present invention, the front driveline will additionally be designated herein as the second driveline 12 and the rear driveline will additionally be designated herein as the first driveline 14.

The drivelines 12, 14 include respective sets of driven wheels 22, 32. In the case of the second or front driveline 12, the driven wheels 22 are connected at opposite ends of a front axle assembly 24 having a front differential 26 that is coupled to one end of a front drive shaft 28, the opposite end of which is coupled to a front output shaft 30 of the transfer unit 20. Similarly, in the case of the first or rear driveline 14, the driven wheels 32 are connected at opposite ends of a rear axle assembly 34 having a rear differential 36 coupled to one end of a rear drive shaft 38, the opposite end of which is interconnected to a rear output shaft 40 of the transfer unit 20. As will be detailed hereinafter with greater specificity, the transfer unit is configured to control the torque distribution between output shafts 30 and 40. The designation of the wheels 22, 32 as "driven" wheels represents the fact that both sets of wheels are coupled to the power source 16 through the transfer unit 20. The transfer unit 20 may selectively transfer any percentage (0% to 100%) of available torque to one of the sets of wheels 22, 32, any remaining available torque being transferred to the remaining set of wheels. Accordingly, the commanded transfer torque signal may represent an amount of torque to transfer from the source of power to the driveline, the second driveline, or both the first and second drivelines.

Typically, the transfer unit is configured to effect torque transfer through utilization of a suitable clutch assembly. Suitable clutch assembly types include "bang-on" systems, incremental engagement clutches, clutch assemblies where engagement is proportional to the magnitude of a drive signal (e.g., the magnitude of a drive signal representing the transfer torque value described below), and clutch assemblies where engagement is initiated at a target value and then adjusted to subsequent values based upon a recalculated target value. It is contemplated that clutch actuation could be accomplished by any suitable mechanism, including electric, electromagnetic, hydraulic (including hydraulic arm), or pneumatic mechanisms, or by means of a combination of the recited mechanisms.

Figure 1:
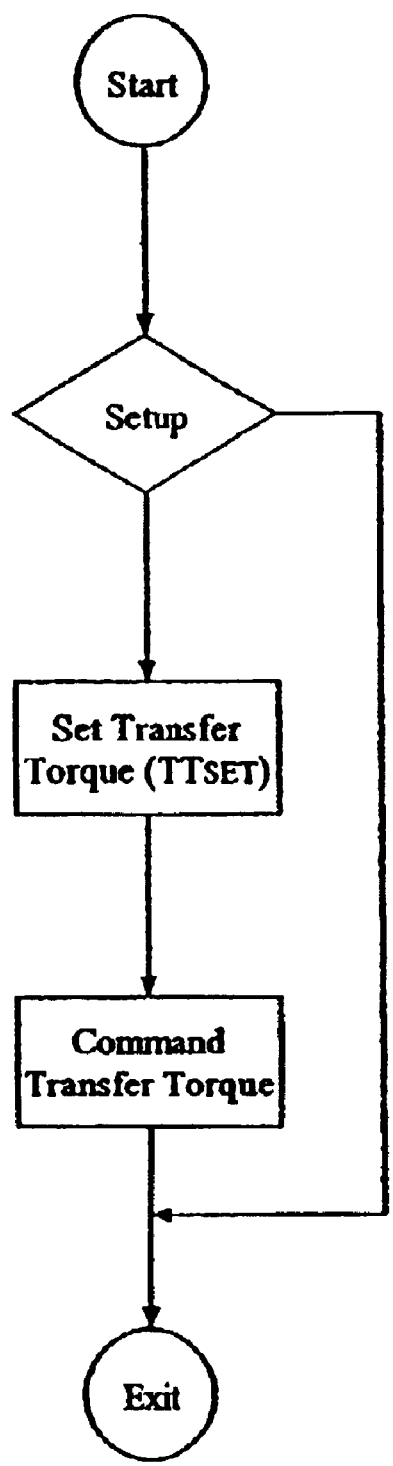
FIG. 1 is a flowchart illustrating the general operational steps of a drive torque transfer scheme according to one embodiment of the present invention.

Referring to FIG. 1, the drive torque transfer scheme of the present invention includes three general components: "Setup," "Set Transfer Torque ($TT_{SET}$)," and "Command Transfer Torque." As is illustrated in FIG. 1, the setup component of the transfer scheme involves, among other things, a determination of whether it is appropriate to set a transfer torque value. Transfer torque is not set or commanded if the steps of the setup component determine that transfer torque is not needed. The steps of the setup component are illustrated in detail below with reference to FIG. 2.

Figure 2:
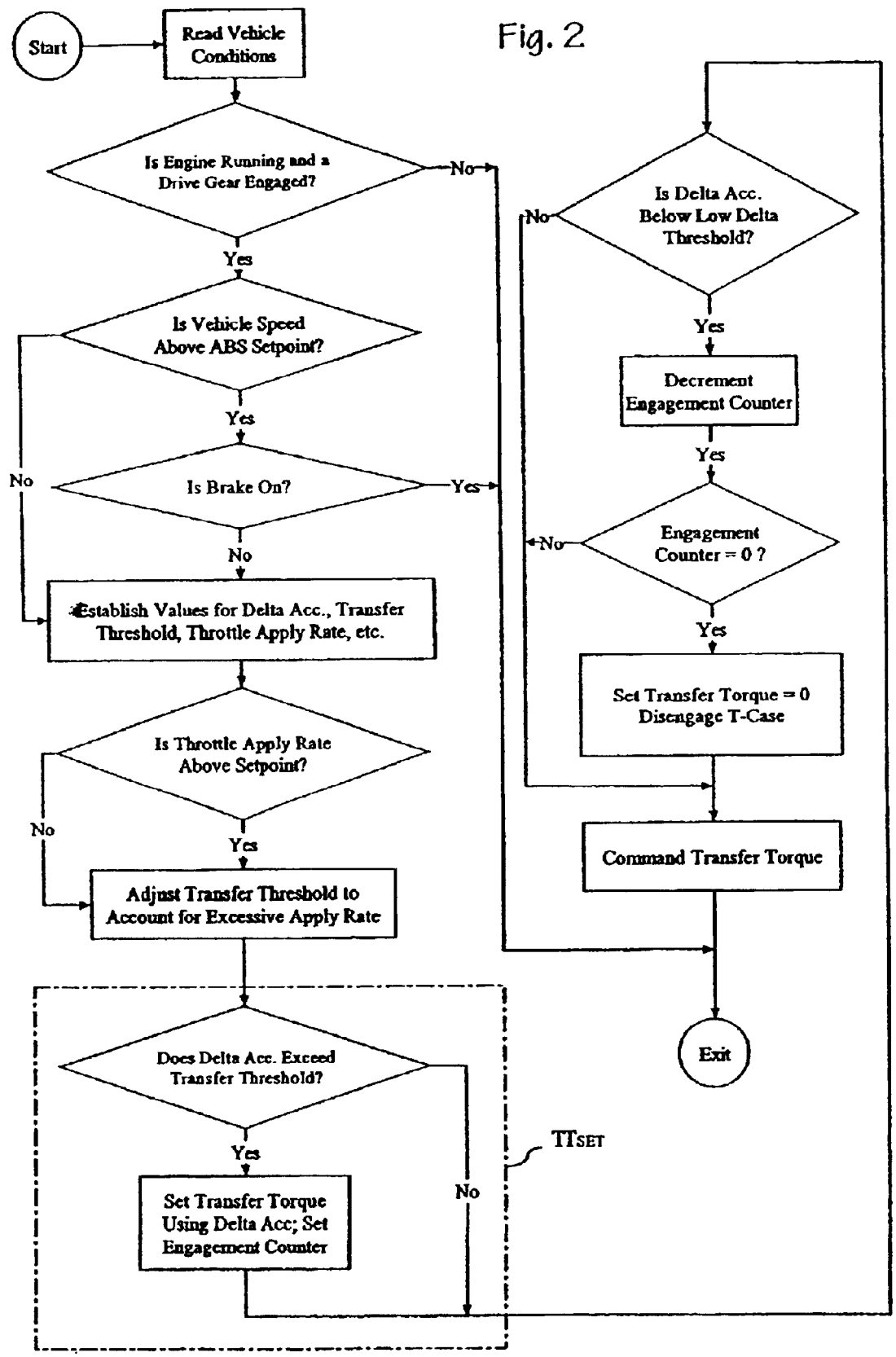
FIG. 2 is a flowchart illustrating in detail the operational steps of a drive torque transfer scheme according to one embodiment of the present invention.

Referring now to FIG. 2, the operational steps of a drive torque transfer scheme according to one embodiment of the present invention are illustrated in detail. Initially, the scheme calls for reading of the vehicle conditions needed or preferred for the subsequent steps of the transfer scheme ("Read Vehicle Conditions"). Typically, a number of vehicle, engine, braking, and drive train conditions are read to facilitate torque transfer (e.g., vehicle speed, throttle position, engine RPM, brake on/off, brake torque, brake position, transmission gear, transmission speed, wheel speeds, wheel torques, vehicle GPS data, vehicle acceleration, road grade, vehicle weight, etc.). It is contemplated that, although certain conditions are expressly utilized in the transfer schemes described herein, it may be possible to derive these conditions without directly reading. This can be accomplished by reading related vehicle conditions and using the related conditions to derive the conditions actually used in the transfer scheme. As will be appreciated in view of the wide variety of conditions to be read, it is contemplated that the conditions may be read by measuring, inputting, calculating, estimating, deriving, or by any other suitable means.

After the appropriate vehicle conditions have been read, a determination is made as to whether the engine is running and whether a drive gear is engaged ("Is Engine Running and Drive Gear Engaged?"). If not, a transfer torque will not be set or commanded. Otherwise, the scheme continues by determining whether the vehicle's anti-lock braking system is active ("Is Vehicle Speed Above ABS Setpoint?" "Is Brake on?"). If the anti-lock braking system is active, a transfer torque will not be set or commanded. Otherwise, the scheme proceeds by establishing values for constants and variables that will be used to set the transfer torque ("Establish Values for Delta Acc., Transfer Threshold, Throttle Apply Rate, etc."). These constants and variables are discussed in detail below and it is noted that they may be determined in one step, as is illustrated in FIG. 2, or in a number of steps interspersed throughout the scheme of the present invention.

In the illustrated scheme, the throttle apply rate is scrutinized to determine whether it is excessive and, if so, the primary threshold used to determine whether torque transfer should be affected is adjusted ("Is Throttle Apply Rate Above Setpoint?" "Adjust Transfer Threshold to Account for Excessive Apply Rate"). Specifically, if the throttle apply rate is greater than a given value represented by a predetermined constant, the transfer threshold is reduced. In this manner, the torque transfer scheme may be made more sensitive to wheel slippage under rapid throttle apply conditions. The transfer threshold may be determined by any suitable means or may be calculated as a product of the desired vehicle acceleration and an adaptive constant:

TransferThreshold=DesiredVehicleAcceleration*$K$

The adaptive constant is established to represent a suitable relationship between the desired vehicle acceleration and the transfer threshold. The transfer threshold may be reduced, as is noted above, by an amount equal to the product of the throttle apply rate, the desired vehicle acceleration, and an adaptive constant:

TransferThreshold=TransferThreshold−
((ThrottleApplyRate)*(DesiredVehicleAcc.)*($K$))

The adaptive constant is established for effective adjustment of the transfer threshold and is typically determined with reference to existing models or through routine experimentation, as is the case with all adaptive constants described herein. The throttle apply rate may be determined by any suitable means or may conveniently be determined by measuring throttle positions at times $t_1$ and $t_2$ and dividing the difference between the two positions by the time period between $t_1$ and $t_2$:

$$ThrottleApplyRate = \frac{(ThrottlePosition\,(t_1) - ThrottlePosition\,(t_2))}{t_2 - t_1}$$

The desired vehicle acceleration may determined by any suitable means or may be equated with a product of the desired engine output torque, road surface vehicle grade, and an adaptive constant representing the highest coefficient of friction of the road surface, divided by vehicle weight:

$$DesiredVehicleAcceleration = \left(\frac{(DesiredEngineOutputTorque)*(K)}{VehicleWeight}\right)*Grade$$

where the desired engine output torque is determined by any suitable means or by calculating the product of the throttle position, the maximum engine output torque for the particular drive gear in use, and an adaptive constant representing engine latency:

DesiredEngineOutputTorque=
ThrottlePosition*MaxEngineOutputTorque*LatencyConst.

The quantity of torque to transfer ($TT_{SET}$), if any, is determined after completion of the above described analysis related to adjusting the transfer threshold in view of the throttle apply rate, and following any other necessary or suitable adjustments to the transfer threshold.

A procedure by which a torque transfer value may be established is illustrated in FIG. 2 (see $TT_{SET}$). The delta acceleration signal is established by determining the difference between the actual acceleration of the first driveline and the desired vehicle acceleration:

DeltaAcceleration=(ActualDriveLineAcc.)−(DesiredVehicleAcceleration)

where the actual driveline acceleration may be determined by any suitable means, including means by which speed or acceleration sensors measure rotational conditions of the vehicle wheels or any portion of the driveline (including elements of the transmission, drive shaft, etc.). For example, the driveline acceleration may be determined from temporally displaced measurements of the driveline speed:

$$ActualDriveLineAcc. = \frac{(DriveLineSpeed\ (t_1) - DriveLineSpeed\ (t_2))}{t_2 - t_1}$$

As is illustrated in FIG. 2, once the delta acceleration signal is established, it is available for comparison to the transfer threshold ("Does Delta Acc. Exceed Transfer Threshold?"). A transfer torque value is set if the delta acceleration signal exceeds the transfer threshold and that transfer torque value is maintained for a predetermined minimum amount of time, as set by an engagement counter ("Set Transfer Torque Using Delta Acc; Set Engagement Counter"). The value of the transfer torque is a function of the delta acceleration signal and may be determined through any suitable means or by calculating the product of the delta acceleration signal and an adaptive constant suitable for conversion of the delta acceleration signal into torque based on the characteristics of the transfer unit in use:

TransferTorque=DeltaAcceleration*$K$

The engagement counter is set to any value deemed suitable for proper system operation and establishes a minimum amount of time for active torque transfer following return of the delta signal below the torque transfer threshold. As is illustrated in the flow chart of FIG. 2, the engagement counter is decremented in response to a signal indicating that the delta acceleration signal is lower than a low delta threshold ("Is Delta Acc. Below Low Delta Threshold?" "Decrement Engagement Counter"). In this manner, the control scheme ensures that the minimum amount of time set by the engagement counter runs from a point at which the delta signal goes below a low delta threshold. The low delta threshold is lower than the torque transfer threshold utilized in the torque transfer control algorithm.

As is further illustrated in FIG. 2, if the delta acceleration signal is not lower than the low delta threshold, then the torque transfer control algorithm commands the transfer torque and the delta signal is refreshed by exiting and restarting the transfer torque scheme ("Command Transfer Torque" "Exit"). Similarly, even if the delta acceleration signal falls below the low delta threshold, the delta signal is refreshed by exiting and restarting the transfer torque scheme as long as the engagement counter has not reached zero ("Decrement Engagement Counter" "Engagement Counter=0?"). When the engagement counter reaches zero, the transfer torque is set to zero and the transfer unit is disengaged ("Set Transfer Torque=0; Disengage T-Case").

It is noted that, although the embodiment of FIG. 2 is described with reference to a delta acceleration signal, i.e., a delta signal based on the acceleration of the driveline, the delta signal may be based on any rotational condition of the driveline and need not be directly based on acceleration. For example, in a more general sense, the delta signal comprises a signal indicative of a difference between a reference value and the rotational condition of the first driveline. In this manner, the torque transfer control algorithm of the present invention is substantially independent of any rotational condition of the second driveline over a primary operational range of the algorithm. It is noted that the torque transfer control algorithm is referred to herein as being "substantially" independent of a rotational condition of said second driveline in order to anticipate that relatively insignificant aspects of the algorithm may rely upon a signal representative of a rotational condition of the second driveline. Similarly, the algorithm is referred to herein as being independent of any rotational condition of the second driveline over a "primary" operational range of the algorithm to anticipate that the algorithm may, under specific sets of conditions, deviate from control that is independent of the rotational condition of the second driveline. Of course, it is contemplated that specific embodiments of the present invention utilize torque transfer control algorithms that are independent of any rotational condition of the second driveline over a majority, or substantially all of the operational range of the algorithm. Similarly, it is contemplated that specific embodiments of the present invention utilize torque transfer control algorithms that are totally independent of any rotational condition of the second driveline over a majority, substantially all, or all of the operational range of the algorithm.

The reference value may comprise a desired vehicle acceleration value, an actual vehicle acceleration value, a vehicle ground speed value, a temporally displaced first driveline acceleration value, or combinations thereof. The delta signal itself may be determined utilizing an adaptive constant and a value indicative of the difference between the reference value and the rotational condition of the first driveline. The rotational condition of the first driveline may comprise a rotational acceleration of the driveline or a rotational speed of the driveline. In specific embodiments of the present invention, the delta signal comprises a signal indicative of a temporal change in either the rotational speed or the rotational acceleration of the first driveline. In this manner, temporal increases or "spikes" in the rotational condition of the driveline may be compared with a reference value to determine if torque transfer is appropriate. Similarly, historical wheel acceleration or speed data taken over a given period of time, e.g., 0.5–1 sec., may be compared to current wheel acceleration or speed data and if the difference between the two exceeds a predetermined threshold, torque transfer can be affected.

According to the embodiment of the present invention illustrated above, the delta signal is a function of the actual acceleration of the first driveline and the desired vehicle acceleration. Alternatively, the delta signal may be determined as a function of the actual acceleration of the first driveline, the desired vehicle acceleration, the vehicle acceleration, and an adaptive constant:

DeltaAcceleration=ActualDriveLineAcc.−((DesiredVehicleAcc.+ActualVehicleAcc.)*$K$)

where the adaptive constant is a calibration constant utilized to appropriately weight the sum of the desired vehicle acceleration and the actual vehicle acceleration. In one embodiment of the present invention, this constant is about 0.5. The actual vehicle acceleration may be generated by any suitable means or, more specifically, by an independent accelerometer, an accelerometer associated with an existing independent vehicle system, or by reference to existing monitored vehicular condition data. Examples of existing independent vehicle systems include vehicle braking systems, vehicle safety systems, vehicle diagnostic systems, and central vehicle data storage systems.

As a further alternative, the delta signal may comprise a delta acceleration signal indicative of a difference between the first driveline acceleration and an actual vehicle acceleration:

DeltaAcceleration=ActualDriveLineAcc.−ActualVehicleAcc.

Ground speed measurements may also be utilized to generate the delta signal. Specifically, the delta signal may comprise a delta acceleration signal indicative of a difference between a speed of the first driveline and an actual vehicle groundspeed:

DeltaAcceleration=(ActualDriveLineSpeed−GroundSpeed)*K where K is a calibration constant that converts speed into torque, based on the characteristics of the transfer unit in use. The driveline speed may be determined by using a speed sensor to measure the actual rotational speed of any portion of the driveline (including elements of the transmission, drive shaft, etc.) or may be determined using wheel speed sensors and by converting wheel speed to driveline speed using a steering angle correction factor. The actual vehicle groundspeed may be determined by any suitable means, including a ground speed sensor. The ground speed sensor may be onboard or off board and may be configured to utilize radar, laser, sonar, GPS data, or combinations thereof.

Figure 3:
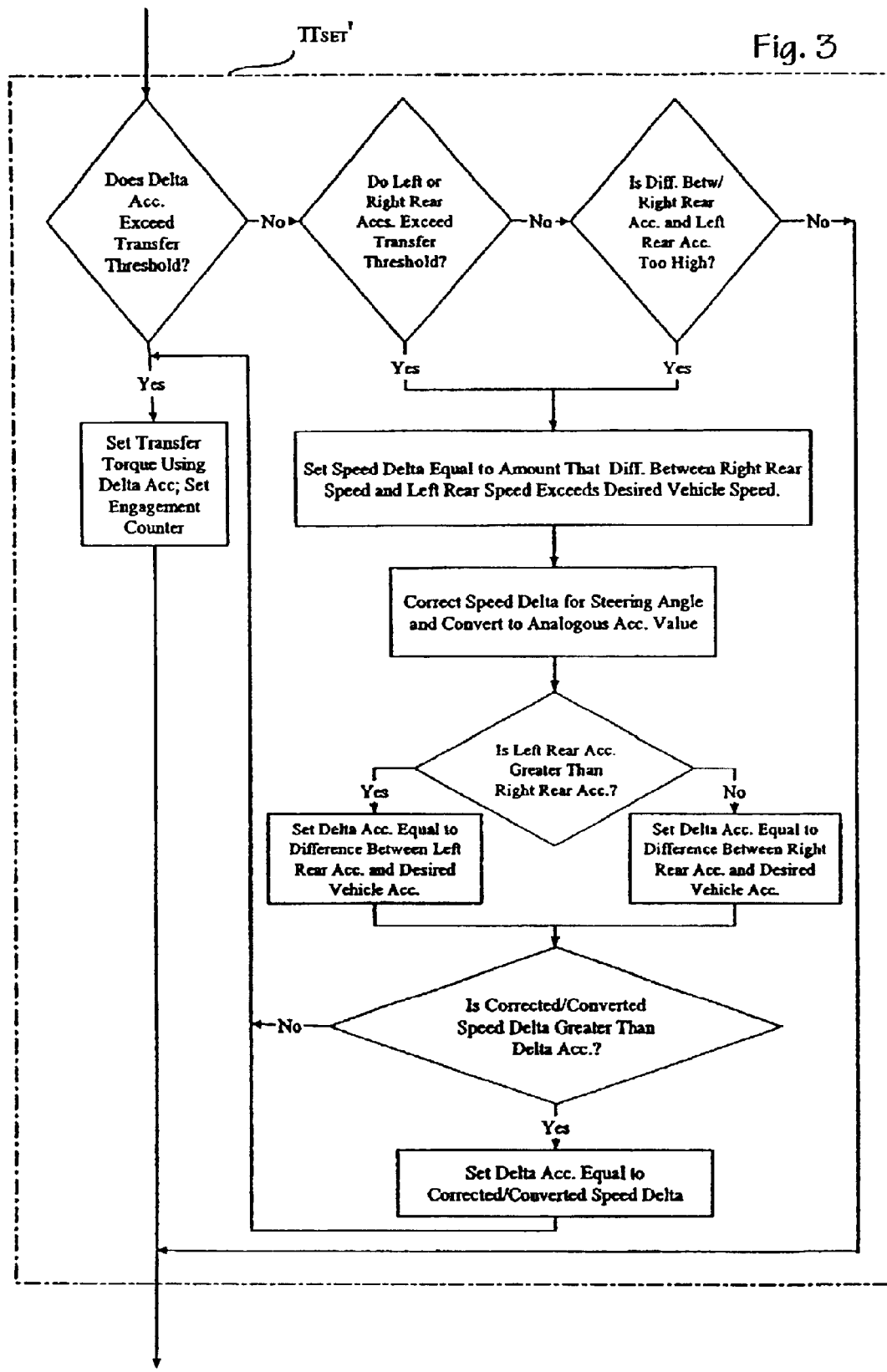
FIGS. 3–5 are flowcharts illustrating alternative procedures by which a torque transfer value may be established according to the present invention.

As will be discussed in detail below with reference to FIGS. 3–5, the delta signal may comprise a signal indicative of a difference between a reference value and a selected one of a plurality of different rotational conditions of the first driveline. In the embodiments of FIGS. 3–5, where the delta signal described in FIG. 2 comprises the primary rotational condition for use by the control algorithm, the control algorithm automatically selects an alternative rotational condition. The control algorithm selects the alternative rotational condition over the primary rotational condition when a difference between the reference value and the primary rotational condition does not exceed a torque transfer threshold and when a difference between the reference value and the alternative rotational condition exceeds the torque transfer threshold.

In the embodiment illustrated in FIG. 3, the procedure denoted as $TT_{SET}$ in FIG. 2 is replaced by an alternative procedure $TT_{SET}'$. The alternative procedure of FIG. 3 utilizes the primary delta signal of FIG. 2 but also introduces an alternative delta signal for consideration when the delta signal does not exceed the torque transfer threshold. Specifically, the alternative delta signal is representative of the respective accelerations of left and right wheels coupled to the first driveline. If the alternative delta signal exceeds the torque transfer threshold and the primary delta signal does not exceed the torque transfer threshold, then the torque transfer control algorithm commands the transfer torque as a function of the alternative delta signal.

If the primary delta signal does not exceed the transfer threshold, the procedure of FIG. 3 prompts for inquiry as to whether the left rear or right rear wheel accelerations exceed the transfer thresholds ("Do Left or Right Rear Accs. Exceed Transfer Threshold?") and/or whether the difference between the right rear acceleration and the left rear acceleration is higher that a predetermined amount ("Is Diff. Betw/ Right Rear Acc. and Left Rear Acc. Too High?"). If the answer to either of these questions is in the affirmative, then a speed delta is set equal to the amount that the difference between the right rear speed and the left rear speed exceeds the desired vehicle speed ("Set Speed Delta Equal to Amount That Diff. Between Right Rear Speed and Left Rear Speed Exceeds Desired Vehicle Speed."):

SpeedDelta=|(RightrearSpeed−LeftrearSpeed)|−DesiredVehicleSpeed

If the answer to both of these questions is in the negative, then no transfer torque is set.

Referring further to FIG. 3, once the speed delta is set, it may be corrected to account for any steering angle conditions and should be converted to an analogous acceleration value using an adaptive constant ("Correct Speed Delta for Steering Angle and Convert to Analogous Acc. Value"). If the left rear acceleration is greater than the right rear acceleration, then the delta signal is equated with the difference between the left rear acceleration and the desired vehicle acceleration ("Is Left Rear Acc. Greater Than Right Rear Acc.?" "Set Delta Acc. Equal to Difference Between Left Rear Acc. and Desired Vehicle Acc."):

DeltaAcceleration.=LeftrearAcc.−DesiredVehicleAcc.

Otherwise, the delta signal is equated with the difference between the right rear acceleration and the desired vehicle acceleration ("Set Delta Acc. Equal to Difference Between Right Rear Acc. and Desired Vehicle Acc."):

DeltaAcceleration=RigthrearAcc.−DesiredVehicleAcc.

The new delta signal, having been equated with either the difference between either the left or right rear acceleration and the desired vehicle acceleration, is used to set the transfer torque unless the speed delta, corrected for steering angle and converted to an analogous acceleration value, is greater than the new delta signal ("Is Corrected/Converted Speed Delta Greater Than Delta Acc.?"). If the corrected/converted speed delta is the greater value, then it is established as the new delta signal and is utilized to set the transfer torque ("Set Delta Acc. Equal to Corrected/Converted Speed Delta").

In the embodiment illustrated in FIG. 4, the procedure denoted as $TT_{SET}$ in FIG. 2 is replaced by an alternative procedure $TT_{SET}''$. The alternative procedure of FIG. 4 utilizes the primary delta signal of FIG. 2 but also introduces an alternative delta signal for consideration when the delta signal does not exceed the torque transfer threshold. Specifically, the alternative delta signal is representative of respective left and right wheel torque signals sensed at the left and right wheels coupled to the first driveline. If the alternative delta signal exceeds the torque transfer threshold and the primary delta signal does not exceed the torque transfer threshold, then the torque transfer control algorithm commands the transfer torque as a function of the alternative delta signal.

If the primary delta signal does not exceed the transfer threshold, the procedure of FIG. 4 calls for reading actual sensor output torques at the left and right rear wheels ("Read Corner Torque Sensors"). The left and right rear wheel torque signals are compared with corresponding left and right desired output torques to generate left and right wheel delta torques. The right rear wheel delta torque and the left rear wheel delta torque may be calibrated to a suitable value by conversion through application of an adaptive constant ("Generate and Convert Corner Delta Torques"). Next, an inquiry is made as to whether either of the converted delta torques exceeds the torque transfer threshold ("Do Any Converted Corner Delta Torques Exceed Transfer Threshold"). If so, the delta signal is set equal to the higher of the two converted delta torques and the transfer torque is set using the new delta signal ("Set Delta Acc. to Higher Converted Corner Delta Torque" "Set Transfer Torque Using Delta Acc").

In the embodiment illustrated in FIG. 5, the procedure denoted as $TT_{SET}$ in FIG. 2 is replaced by an alternative procedure $TT_{SET}'''$. The alternative procedure of FIG. 5 utilizes the primary delta signal of FIG. 2 but also introduces an alternative delta signal for consideration when the delta signal does not exceed the torque transfer threshold. Specifically, the alternative delta signal is representative of the distance traveled by the vehicle. If the alternative delta signal exceeds the torque transfer threshold and the primary delta signal does not exceed the torque transfer threshold, then the torque transfer control algorithm commands the transfer torque as a function of the alternative delta signal.

If the primary delta signal does not exceed the transfer threshold, the procedure of FIG. 5 calls for reading the actual distance traveled by the vehicle ("Read Vehicle Distance Traveled"). This information may be read from any suitable source. For example, the actual distance traveled may be derived from GPS data. The actual vehicle distance data is then compared to a distance value derived from driveline or wheel rotation data to generate a distance delta. The distance delta is then converted, through application of an adaptive constant, to a calibrated value that may be compared with the transfer threshold ("Generate and Convert Distance Delta"). An inquiry is then made as to whether the converted distance delta exceeds the transfer threshold ("Does Converted Distance Delta Exceed Transfer Threshold?"). If so, the delta signal is set equal to the converted distance delta and the transfer torque is set using the new delta signal ("Set Delta Acc. Equal to Converted Distance Delta" "Set Transfer Torque Using Delta Acc").

For the purposes of describing and defining the present invention, it is noted that the term "signal" includes any machine-, computer-, or human-readable indication, including electrical, mechanical, visual, audible, etc. The adaptive constants discussed herein are utilized for calibration, conversion, correction, or other type of modification of a value and are determined with reference to existing information or models or through routine experimentation. Further, it is noted that the controller described generally herein comprises any element or structure that can execute the steps of an algorithm, either as a stand-alone element or in cooperation with associated elements.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of controlling torque transfer in a drive train of a wheeled vehicle, said drive train comprising a source of power, a first driveline, a second driveline, and a torque transfer unit configured to couple said source of power to said first and second drivelines, said method comprising:

generating a delta signal indicative of a rotational condition of said first driveline; and controlling said torque transfer unit as a function of a torque transfer control algorithm, wherein said torque transfer control algorithm is a function of said delta signal indicative of said rotational condition of said first driveline, said torque transfer control algorithm is substantially independent of any rotational condition of said second driveline over a primary operational range of said algorithm; and said torque transfer control algorithm commands a transfer torque representing an amount of torque to transfer from said source of power to one of said first and second drivelines.

2. A method of controlling torque transfer as claimed in claim 1 wherein said delta signal comprises a signal indicative of a difference between a reference value and said rotational condition of said first driveline.

3. A method of controlling torque transfer as claimed in claim 2 wherein said rotational condition of said first driveline is indicative of a temporal change in one of rotational speed and rotational acceleration of said first driveline.

4. A method of controlling torque transfer as claimed in claim 3 wherein said reference value provides an indication of whether temporal increases in said rotational condition of said first driveline are significant enough to warrant torque transfer from said source of power to one of said first and second drivelines.

5. A method of controlling torque transfer as claimed in claim 3 wherein said reference value provides an indication of whether a variation of one of current wheel acceleration, speed data from historical wheel acceleration and speed data is significant enough to warrant torque transfer from said source of power to one of said first and second drivelines.

6. A method of controlling torque transfer as claimed in claim 2 wherein said reference value comprises a desired vehicle acceleration value.

7. A method of controlling torque transfer as claimed in claim 2 wherein said reference value comprises one of a desired vehicle acceleration value, an actual vehicle acceleration value, a vehicle ground speed value, temporally displaced first driveline acceleration values, temporally displaced first driveline speed values, and combinations thereof.

8. A method of controlling torque transfer as claimed in claim 7 wherein said delta signal is determined utilizing an adaptive constant and a value indicative of said difference between said reference value and said rotational condition of said first driveline.

9. A method of controlling torque transfer as claimed in claim 2 wherein said rotational condition of said first driveline comprises a rotational acceleration of said driveline.

10. A method of controlling torque transfer as claimed in claim 2 wherein said rotational condition of said first driveline comprises a rotational speed of said first driveline.

11. A method of controlling torque transfer as claimed in claim 1 wherein said delta signal comprises a signal indicative of a difference between a reference value and a selected one of a plurality of different rotational conditions of said first driveline.

12. A method of controlling torque transfer as claimed in claim 11 wherein said control algorithm determines said selected rotational condition.

13. A method of controlling torque transfer as claimed in claim 11 wherein said plurality of rotational conditions include a primary rotational condition and at least one alternative rotational condition.

14. A method of controlling torque transfer as claimed in claim 13 wherein said control algorithm selects said alternative rotational condition over said primary rotational condition when a difference between said reference value and said rotational condition does not exceed a torque transfer threshold and when a difference between said reference value and said alternative rotational condition exceeds said torque transfer threshold.

15. A method of controlling torque transfer as claimed in claim 1 wherein:
said torque transfer control algorithm commands said transfer torque as a function of said delta signal when said delta signal exceeds a torque transfer threshold;
said torque transfer control algorithm commands said transfer torque as a function of an alternative delta signal when said alternative delta signal exceeds said torque transfer threshold and said delta signal does not exceed said torque transfer threshold.

16. A method of controlling torque transfer as claimed in claim 1 wherein said delta signal comprises a signal indicative of a temporal change of said rotational condition of said first driveline.

17. A method of controlling torque transfer as claimed in claim 16 wherein said temporal change of said rotational condition comprises a change in rotational speed of said first driveline.

18. A method of controlling torque transfer as claimed in claim 16 wherein said temporal change of said rotational condition comprises a change in rotational acceleration of said first driveline.

19. A method of controlling torque transfer as claimed in claim 1 wherein said delta signal comprises a delta acceleration signal indicative of a difference between said first driveline acceleration and a desired vehicle acceleration.

20. A method of controlling torque transfer as claimed in claim 19 wherein said desired acceleration is determined as a function of desired engine output torque, vehicle weight, and grade.

21. A method of controlling torque transfer as claimed in claim 20 wherein said desired engine output torque is determined as a function of maximum engine output torque and a desired torque command signal.

22. A method of controlling torque transfer as claimed in claim 21 wherein said desired torque command signal is generated by a throttle position sensor.

23. A method of controlling torque transfer as claimed in claim 1 wherein said delta signal comprises a delta acceleration signal indicative of a difference associated with said first driveline acceleration, a desired vehicle acceleration, and an actual vehicle acceleration.

24. A method of controlling torque transfer as claimed in claim 23 wherein said actual vehicle acceleration is generated by an accelerometer.

25. A method of controlling torque transfer as claimed in claim 1 wherein said delta signal comprises a delta acceleration signal indicative of a difference associated with at least one of a first driveline acceleration, a desired vehicle acceleration, an actual vehicle acceleration, and a calibration constant.

26. A method of controlling torque transfer as claimed in claim 1 wherein said delta signal comprises a delta acceleration signal indicative of a difference between a first driveline acceleration and an actual vehicle acceleration.

27. A method of controlling torque transfer as claimed in claim 26 wherein said actual vehicle acceleration is generated by an accelerometer.

28. A method of controlling torque transfer as claimed in claim 26 wherein said actual vehicle acceleration is input from an independent system.

29. A method of controlling torque transfer as claimed in claim 28 wherein said independent system comprises one of a vehicle braking system, a vehicle safety system, a vehicle diagnostic system, and a central vehicle data storage system.

30. A method of controlling torque transfer as claimed in claim 1 wherein said delta signal comprises a delta acceleration signal indicative of a difference between a speed of said first driveline and an actual vehicle groundspeed.

31. A method of controlling torque transfer as claimed in claim 30 wherein said driveline speed is determined using wheel speed sensors and by converting wheel speed to driveline speed using a steering angle correction factor.

32. A method of controlling torque transfer as claimed in claim 30 wherein said actual vehicle groundspeed is determined using a ground speed sensor.

33. A method of controlling torque transfer as claimed in claim 32 wherein said ground speed sensor is configured to utilize one or more of radar, laser, sonar, and GPS data.

34. A method of controlling torque transfer as claimed in claim 1 wherein said torque transfer control algorithm commands said transfer torque when said delta signal exceeds a torque transfer threshold.

35. A method of controlling torque transfer as claimed in claim 1 wherein said torque transfer control algorithm is a further function of a torque transfer threshold.

36. A method of controlling torque transfer as claimed in claim 35 wherein said torque transfer threshold value is a function of a desired acceleration signal.

37. A method of controlling torque transfer as claimed in claim 35 wherein said torque transfer threshold value is adjusted to account for excessive throttle apply rate.

38. A method of controlling torque transfer as claimed in claim 1 wherein said delta signal is generated depending upon engine running and drive gear engaged signals.

39. A method of controlling torque transfer as claimed in claim 1 wherein said delta signal is generated depending upon whether conditions are suitable for activation of an anti-lock braking system associated with components coupled one or both of said first and second drivelines.

40. A method of controlling torque transfer as claimed in claim 1 wherein:
said torque transfer control algorithm commands said transfer torque when said delta signal exceeds a torque transfer threshold; and
said delta signal is refreshed after said algorithm commands said transfer torque.

41. A method of controlling torque transfer as claimed in claim 1 wherein:
said torque transfer control algorithm commands said transfer torque when said delta signal exceeds a torque transfer threshold; and
said commanded transfer torque is maintained for a minimum amount of time following return of said delta signal below said torque transfer threshold.

42. A method of controlling torque transfer as claimed in claim 41 wherein said minimum amount of time is established through the use of an engagement counter.

43. A method of controlling torque transfer as claimed in claim 42 wherein said engagement counter is decremented in response to a signal indicating that said delta signal is lower than a low delta threshold.

44. A method of controlling torque transfer as claimed in claim 41 wherein said minimum amount of time runs from a point at which said delta signal goes below a low delta threshold.

45. A method of controlling torque transfer as claimed in claim 44 wherein said low delta threshold is lower than a torque transfer threshold utilized in said torque transfer control algorithm.

46. A method of controlling torque transfer as claimed in claim 1 further comprising the step of generating an alternative delta signal representative of the respective accelerations of left and right wheels coupled to said first driveline, wherein:

said torque transfer control algorithm commands said transfer torque as a function of said delta signal when said delta signal exceeds a torque transfer threshold; and said torque transfer control algorithm commands said transfer torque as a function of said alternative delta signal when said alternative delta signal exceeds said torque transfer threshold and said delta signal does not exceed said torque transfer threshold.

47. A method of controlling torque transfer as claimed in claim 46 wherein said torque transfer control algorithm commands said transfer torque as a function of said alternative delta signal when said alternative delta signal, converted to an analogous acceleration value, further exceeds the greater of (i) a difference between a left rear acceleration and a desired vehicle acceleration and (ii) a difference between a right rear acceleration and a desired vehicle acceleration.

48. A method of controlling torque transfer as claimed in claim 46 wherein said alternative delta signal is generated by comparing a right wheel speed, a left wheel speed, and a desired vehicle speed.

49. A method of controlling torque transfer as claimed in claim 46 wherein said alternative delta signal is generated by determining an amount by which a difference between said right wheel speed and said left wheel speed exceeds a desired vehicle speed.

50. A method of controlling torque transfer as claimed in claim 49 wherein said alternative delta signal is generated by determining an amount by which a difference between said right wheel speed and said left wheel speed exceeds a desired vehicle speed and by correcting said determined amount with a steering angle signal.

51. A method of controlling torque transfer as claimed in claim 46 wherein said alternative delta signal is generated by comparing said right wheel speed, said left wheel speed, and a desired vehicle speed and converting a result of said comparison to an analogous acceleration value.

52. A method of controlling torque transfer as claimed in claim 1 further comprising the step of generating an alternative delta signal representative of respective left and right wheel torque signals sensed at left and right wheels coupled to said first driveline, wherein:

said torque transfer control algorithm commands said transfer torque as a function of said delta signal when said delta signal exceeds a torque transfer threshold; and said torque transfer control algorithm commands said transfer torque as a function of said alternative delta signal when said alternative delta signal exceeds said torque transfer threshold and said delta signal does not exceed said torque transfer threshold.

53. A method of controlling torque transfer as claimed in claim 52 wherein said alternative delta signal is generated by comparing said left and right wheel torque signals with corresponding left and right desired output torques to generate left and right wheel delta torques.

54. A method of controlling torque transfer as claimed in claim 53 wherein said alternative delta signal is generated by:

converting said right wheel delta torque and said left wheel delta torque with an adaptive constant;

determining whether either of said converted delta torques exceeds said torque transfer threshold; and establishing the higher of said converted delta torques as said alternative delta signal converted when said higher converted delta torque exceeds said torque transfer threshold.

55. A method of controlling torque transfer as claimed in claim 1 further comprising the step of generating an alternative delta signal representative of a distance traveled by said wheeled vehicle, wherein:

said torque transfer control algorithm commands said transfer torque as a function of said delta signal when said delta signal exceeds a torque transfer threshold; and said torque transfer control algorithm commands said transfer torque as a function of said alternative delta signal when said alternative delta signal exceeds said torque transfer threshold and said delta signal does not exceed said torque transfer threshold.

56. A method of controlling torque transfer as claimed in claim 55 wherein said alternative delta signal is generated by comparing a wheel distance signal with a vehicle distance signal to generate a distance delta signal.

57. A method of controlling torque transfer as claimed in claim 56 wherein said wheel distance signal is determined based on actual rotation of at least one of said wheels.

58. A method of controlling torque transfer as claimed in claim 57 wherein said alternative delta signal is generated by:

converting said distance delta signal with an adaptive constant;

determining whether said converted distance delta signal exceeds said torque transfer threshold; and establishing said converted distance delta signal as said alternative delta signal when said converted distance delta signal exceeds said torque transfer threshold.

59. A method of controlling torque transfer as claimed in claim 1 wherein said torque transfer control algorithm is substantially independent of any rotational condition of said second driveline over a majority of said operational range of said algorithm.

60. A method of controlling torque transfer as claimed in claim 1 wherein said torque transfer control algorithm is substantially independent of any rotational condition of said second driveline over substantially all of said operational range of said algorithm.

61. A method of controlling torque transfer as claimed in claim 1 wherein said torque transfer control algorithm is totally independent of any rotational condition of said second driveline over substantially all of said operational range of said algorithm.

62. A method of controlling torque transfer as claimed in claim 1 wherein said torque transfer control algorithm is totally independent of any rotational condition of said second driveline over all of said operational range of said algorithm.

63. A method of controlling torque transfer as claimed in claim 1 wherein said commanded transfer torque, represented as a percentage of torque to transfer to said second driveline, ranges from about 0% to about 100%.

64. A method of controlling torque transfer as claimed in claim 1 wherein said commanded transfer torque, represented as a percentage of torque to transfer to said first driveline, ranges from about 0% to about 100%.

65. A method of controlling torque transfer as claimed in claim 1 wherein said commanded transfer torque additionally represents an amount of torque to transfer to another of said first and second drivelines.

66. A method of controlling torque transfer in a drive train of a wheeled vehicle, said drive train comprising a source of power, a first driveline, a second driveline, and a torque transfer unit configured to couple said source of power to said first and second drivelines, said method comprising:
generating a delta signal indicative of a difference between a reference value and a rotational condition of said first driveline, wherein
said reference value comprises a desired vehicle acceleration value determined as a function of maximum output torque, a desired torque command signal generated by a throttle position sensor, vehicle weight, and grade, and
said rotational condition of said first driveline is indicative of a temporal change in one of rotational speed and rotational acceleration of said first driveline; and
controlling said torque transfer unit as a function of a torque transfer control algorithm, wherein
said torque transfer control algorithm is a function of said delta signal indicative of said rotational condition of said first driveline,
said torque transfer control algorithm commands a transfer torque representing an amount of torque to transfer from said source of power to one of said first and second drivelines.

67. A method of controlling torque transfer in a drive train of a wheeled vehicle, said drive train comprising a source of power, a first driveline, a second driveline, and a torque transfer unit configured to couple said source of power to said first and second drivelines, said method comprising:
generating a delta signal indicative of a rotational condition of said first driveline, wherein
said delta signal comprises a signal indicative of a difference between a reference value and a selected one of a plurality of different rotational conditions of said first driveline, including a primary rotational condition and at least one alternative rotational condition, and
wherein said reference value comprises one of a desired vehicle acceleration value, an actual vehicle acceleration value, a vehicle ground speed value, temporally displaced first driveline acceleration values, temporally displaced first driveline speed values, and combinations thereof; and
controlling said torque transfer unit as a function of a torque transfer control algorithm, wherein
said control algorithm determines said selected rotational condition and exhibits a preference for said alternative rotational condition over said primary rotational condition when a difference between said reference value and said rotational condition does not exceed a torque transfer threshold and when a difference between said reference value and said alternative rotational condition exceeds said torque transfer threshold,
said torque transfer control algorithm is a function of said delta signal indicative of said selected rotational condition of said first driveline, and
said torque transfer control algorithm commands a transfer torque representing an amount of torque to transfer from said source of power to one of said first and second drivelines.

68. A torque transfer unit configured to couple a source of power to a first driveline and a second driveline of a wheeled vehicle, said transfer unit comprising a controller programmed to:
generate a delta signal indicative of a rotational condition of said first driveline; and
control said torque transfer unit as a function of a torque transfer control algorithm, wherein
said torque transfer control algorithm is a function of said delta signal indicative of said rotational condition of said first driveline,
said torque transfer control algorithm is substantially independent of any rotational condition of said second driveline over a primary operational range of said algorithm; and
said torque transfer control algorithm commands a transfer torque representing an amount of torque to transfer from said source of power to one of said first and second drivelines.

69. A torque transfer unit as claimed in claim 68 wherein said transfer torque represents an amount of torque to transfer to said first driveline.

70. A torque transfer unit as claimed in claim 68 wherein said transfer torque represents an amount of torque to transfer to said second driveline.

71. A torque transfer unit as claimed in claim 68 wherein said transfer torque represents an amount of torque to transfer to said first driveline and said second driveline.

72. A vehicle comprising:
a source of power;
a first driveline including a first set of driven wheels;
a second driveline including a second set of driven wheels; and
a torque transfer unit configured to couple said source of power to said first and second drivelines, said torque transfer unit comprising a controller programmed to
generate a delta signal indicative of a rotational condition of said first driveline, and
control said torque transfer unit as a function of a torque transfer control algorithm, wherein
said torque transfer control algorithm is a function of said delta signal indicative of said rotational condition of said first driveline,
said torque transfer control algorithm is substantially independent of any rotational condition of said second driveline over a primary operational range of said algorithm, and
said torque transfer control algorithm commands a transfer torque representing an amount of torque to transfer from said source of power to one of said first and second drivelines.

73. A vehicle as claimed in claim 72 wherein:
said first set of driven wheels comprise a set of rear vehicle wheels such that said first driveline comprises a rear wheel driveline;
said second set of driven wheels comprise a set of front vehicle wheels such that said second driveline comprises a front wheel driveline; and
said commanded transfer torque represents an amount of torque to transfer to said second driveline.

74. A vehicle as claimed in claim 73 wherein said commanded transfer torque, represented as a percentage of torque to transfer to said second driveline, ranges from about 0% to about 100%.

75. A vehicle as claimed in claim 72 wherein:
said first set of driven wheels comprise a set of rear vehicle wheels such that said first driveline comprises a rear wheel driveline;
said second set of driven wheels comprise a set of front vehicle wheels such that said second driveline comprises a front wheel driveline; and said commanded transfer torque represents an amount of torque to transfer to said first driveline.

76. A vehicle as claimed in claim 75 wherein said commanded transfer torque, represented as a percentage of torque to transfer to said first driveline, ranges from about 0% to about 100%.

77. A vehicle as claimed in claim 72 wherein:

said first set of driven wheels comprise a set of rear vehicle wheels such that said first driveline comprises a rear wheel driveline;

said second set of driven wheels comprise a set of front vehicle wheels such that said second driveline comprises a front wheel driveline; and said commanded transfer torque represents an amount of torque to transfer to said first and second drivelines.

78. A method of controlling torque transfer in a drive train of a wheeled vehicle, said drive train comprising a source of power, a first driveline, a second driveline, and a torque transfer unit configured to couple said source of power to said first and second drivelines, said method comprising:

generating a delta signal indicative of a rotational condition of said first driveline, wherein said delta signal is totally independent of any rotational condition of said second driveline; and controlling said torque transfer unit as a function of a torque transfer control algorithm, wherein said torque transfer control algorithm is a function of said delta signal indicative of said rotational condition of said first driveline; and said torque transfer control algorithm commands a transfer torque representing an amount of torque to transfer from said source of power to one of said first and second drivelines.

* * * * *